United States Patent [19]

Warren

[11] Patent Number: 4,820,557

[45] Date of Patent: Apr. 11, 1989

[54] THERMOPLASTIC PACKAGING FILM OF LOW $I_{10}/I_2$

[75] Inventor: Thomas C. Warren, Greer, S.C.

[73] Assignee: W. R. Grace & Co.-Conn., Duncan, S.C.

[21] Appl. No.: 98,426

[22] Filed: Sep. 17, 1987

[51] Int. Cl.$^4$ .................. B32B 27/08; C08F 110/02; C08F 110/14

[52] U.S. Cl. .................. 428/34.9; 428/516; 428/520; 428/913; 428/349; 428/35.1; 526/348.2; 526/348.4; 526/352.2

[58] Field of Search ............... 526/348.1, 348.2, 348.4, 526/348.6, 352.2; 428/349, 35, 516, 520, 913

[56] References Cited

U.S. PATENT DOCUMENTS

| | | | |
|---|---|---|---|
| 3,741,253 | 6/1973 | Brax et al. | 428/518 |
| 4,064,296 | 12/1977 | Bornstein et al. | 428/516 |
| 4,457,960 | 7/1984 | Newsome | 428/35 |
| 4,525,257 | 6/1985 | Kurtz et al. | 526/339 |
| 4,532,189 | 7/1985 | Mueller | 428/516 |
| 4,639,428 | 1/1987 | Best | 526/129 |
| 4,640,856 | 2/1987 | Ferguson et al. | 428/518 |
| 4,670,413 | 6/1987 | Fortek | 526/129 |
| 4,677,087 | 6/1987 | Lo et al. | 526/129 |
| 4,738,942 | 4/1988 | Nowlin | 526/124 |

OTHER PUBLICATIONS

1/87 "Dowlex ULDPE Polymers" from Dow Chemical Company.

"LLDPE Properties Tied to Branch Distribution", *Plastics Engineering,* Jan. 1987, by Larry D. Cady of Dow Chemical Company, Freeport, Tex.

*Primary Examiner*—Ellis P. Robinson
*Assistant Examiner*—James J. Seidleck
*Attorney, Agent, or Firm*—John J. Toney; William D. Lee,Jr.; Jennifer L. Skord

[57] ABSTRACT

Disclosed is a high abuse-resistance film suitable for making bags and pouches. The film has at least one layer comprising a linear copolymer of ethylene and an alpha-olefin with a density of about 0.935 g/cc or less. The copolymer has a comparatively lower $I_{10}/I_2$ ratio than the corresponding ethylene/alpha-olefin with the same comonomer and essentially the same density and essentially the same melt index at condition 190/2.16.

15 Claims, No Drawings

THERMOPLASTIC PACKAGING FILM OF LOW $I_{10}/I_2$

The invention relates to thermoplastic, packaging films and bags or pouches made therefrom. In particular this invention relates to films and bags having excellent abuse-resistance properties.

Thermoplastic films are being used in packaging of non-food and food products like meat, cheese, poultry and the like. Many attempts have been made to improve abuse-resistance (toughness or strength) without losing other properties such as processability characteristics. Or if the films are oriented, without losing shrink characteristics.

BACKGROUND OF THE INVENTION

A film known from U.S. Pat. No. 3,741,253 to Brax et al comprises a core layer of a vinylidene chloride copolymer (saran) between a layer of ethylene-vinyl acetate copolymer and layer of cross-linked ethylene-vinyl acetate copolymer. Ethylene-vinyl acetate copolymer (EVA) has some improved properties over the previously used polyethylene. Vinylidene chloride copolymers are known barrier materials to fluids such as oxygen.

As disclosed in U.S. Pat. No. 4,064,296 to Bornstein et al the core layer may also be a hydrolyzed ethylene-vinyl acetate copolymer (EVOH). It has similar oxygen barrier properties as vinylidene chloride copolymers and offers the advantage that it may be irradiated without discoloration, which is further discussed below.

Blends of linear low density polyethylene and ethylene-vinyl acetate copolymer in oriented barrier films are disclosed in U.S. Pat. No. 4,457,960 to Newsome, which claims an oriented multiple layer polymeric film, comprising (a) a first barrier layer, said first layer having two opposing surfaces; (b) a second layer adhered to one said surface, said second layer being 10% to 90% linear low density polyethylene and 90% to 10% ethylene vinyl acetate; and (c) a third layer adhered to the other said surface, the composition of said third layer being selected from the group consisting of (i) ethylene-vinyl acetate, and (ii) blends of 10% to 90% linear low density polyethylene with 90% to 10% ethylene-vinyl acetate.

U.S. Pat. No. 4,640,856 to Ferguson et al, commonly assigned to W. R. Grace & Co., discloses a multi-layer, thermoplastic barrier film having at least three layers comprising: (a) a layer consisting essentially of very low density polyethylene having a density of less than 0.910 gms/cc; (b) a barrier layer comprising a material selected from the group consisting of: (1) copolymers of vinylidene chloride and (2) hydrolyzed ethylene-vinyl acetate copolymers; (c) a thermoplastic polymeric layer, said layer being on the side of the barrier layer opposite to that of layer (a); and (d) the shrinkage of layer (a) controlling the shrinkage of the entire multi-layer barrier film, said multi-layer film having been oriented and rendered heat shrinkable at a temperature below 100° C. (212° F.), said orientation temperature being about 40° F. or more below the melt temperature of said very low density polyethylene.

"LLDPE Properties Tied to Branch Distribution", *Plastics Engineering*, January 1987, by Larry D. Cady of Dow Chemical Company, Freeport, Texas discusses four linear low density polyethylenes (LLDPE). Two have the same density of 0.922, the same melt index of 1.0 to 1.1, the same $I_{10}/I_2$ ratio of 7.5 to 7.6, and the same octene comonomer, yet the LLDPE with an elution temperature around 85° C., (FIG. 3) exhibited a higher dart impact of 330 g (Table) than the LLDPE with an elution temperature around 100° C. (FIG. 3) which exhibited a lower dart impact of 193 g (Table).

It is an object of this invention to provide a packaging film and bags made therefrom having excellent abuse resistance and thereby provide a minimal risk of breakages when bags made of the film material are utilized in automated loading processes. The main use of the bags is in packaging large cuts of meat, which often have bony projections and large cavities.

It is another object of this invention to provide a heat-shrinkable material for films and bags having the above advantage yet retaining good shrinkability characteristics, and good orientation processing characteristics.

SUMMARY OF THE INVENTION

Therefore, the present invention provides a packaging film comprising at least one layer of a linear copolymer of ethylene and an alpha-olefin with a density of about 0.935 g/cc or less, said ethylene/alpha-olefin copolymer having a low $I_{10}/I_2$ ratio. The corresponding film with a linear ethylene/alpha-olefin copolymer with the same comonomer and essentially the same density and essentially the same melt index at condition 190/2.16, but with a comparatively higher $I_{10}/I_2$ ratio, will not exhibit as good abuse resistance as the film of the invention. $I_{10}/I_2$ is a melt flow ratio of condition 190/10 to condition 190/2.16 as per ASTM D 1238. The "190" refers to the temperature in degrees centigrade; the "10" and "2.16" refer to the kilogram loading. In a preferred embodiment the film is heat-shrinkable and/or contains a barrier layer.

In a preferred embodiment the invention also provides a thermoplastic, multi-layer, heat-shrinkable packaging film having excellent abuse resistance, comprising an outside polymer layer, a heat sealing layer and an interior layer between said heat sealing and said outside layers, wherein said interior layer comprises a linear copolymer of ethylene and an a alpha-olefin with a density of about 0.935 g/cc or less, said ethylene/alpha-olefin copolymer having a comparatively low $I_{10}/I_2$ ratio. In an even more preferred embodiment, this shrinkable film contains a barrier layer.

The invention also provides a process for manufacturing thermoplastic, multi-layer, heat-shrinkable packaging film comprising (I) extruding at least one layer of a linear copolymer of ethylene and an alpha-olefin with a density of about 0.935 g/cc or less, said ethylene/alpha-olefin copolymer having a low $I_{10}/I_2$ ratio. This process may further include (II) orienting the extruded polymer in at least one direction, and (III) recovering a heat-shrinkable polymeric film.

In another aspect the invention also provides side sealed and/or end sealed bags made from the above-mentioned inventive film.

DETAILED DESCRIPTION OF THE INVENTION

Suitable linear ethylene/alpha-olefin copolymers with a density of about 0.935 g/cc or less, for use in the films of the invention, belong to the class of polymers known as linear low density polyethylene (LLPPE) or very low density linear polyethylene (VLDPE). They must have a low $I_{10}/I_2$ ratio. By "low $I_{10}/I_2$ ratio" is meant that if other factors, such as (a) the melt index at condition 190/2.16 of ASTM D-1238 is essentially the same and (b) the density is essentially the same and (c) the comonomer is the same for two linear ethylene/alpha-olefin copolymers, then the film of the invention made with the one with the lower $I_{10}/I_2$ ratio will exhibit better abuse-resistance than the same film but made with the other. By "essentially the same melt index" is meant that the two melt indices, when measured at condition 190/2.16 of ASTM D1238, are preferably within 0.3 dg/minute, more preferably within 0.2 dg/minute, of each other. Most preferably the two are the same dg/minute. By "essentially the same density" is meant the two densities are preferably within about ±0.05 g/cc, more preferably within about ±0.03 g/cc, of each other. The difference between the higher $I_{10}/I_2$ ratio and the lower $I_{10}/I_2$ ratio should be above about 0.3, more preferably above about 1.0, most preferably above about 2.0. The greater the difference in $I_{10}/I_2$ ratios, the greater the abuse-resistance improvement. For instance, Test Sample 2 in Table II below showed an $I_{10}/I_2$ lower than its comparison by about 8 and showed about a 100% improvement in abuse-resistance over its comparison. VLDPE and LLDPE are further discussed below.

The so called linear low density polyethylenes are copolymers of ethylene and varying amounts of higher alpha-olefins with e.g. 5 to 10 carbon atoms per molecule (U.S. Pat. No. 4,076,698) or 3 to 8 carbon atoms per molecule (Published European Patent Application No. 120503 published Oct. 3, 1984, assigned to Union Carbide), for example copolymers of ethylene and butene-1, copolymers of ethylene and octene-1, and the like. Depending on their density these materials are referred to as linear low density polyethylene (LLDPE) or very low density linear polyethylene (VLDPE), the separation line being at a density of about 0.910 g/cc. Some properties of VLDPE have been described in Plastics Technology, September 1984, page 113. In October 1984, on page 13 of Plastics Technology, was another article describing VLDPE entitled "New Kind of Polyethylene Combines Flexibility, Toughness, Heat Resistance", which lists properties of VLDPE and compares them with EVA. According to the article, two commercially available grades from Union Carbide of VLDPE are designated "DFDA-1137 NT7", which has a narrow molecular weight distribution, higher toughness, clarity, and gloss and FDA clearance for food contact, and "DFDA-1138" which is aimed particularly at film, has a broad molecular weight distribution, and is superior in processability. VLDPE is also described in a company brochure published in February 1984 by DSM in the Netherlands and entitled "Stamylex PE". Their properties are said to be a unique combination between those of standard polyethylene and polyolefinic rubbers. Their sealability and their compatibility with other polymers has been mentioned.

Accordingly, the term "linear low density polyethylene" (LLDPE), as used herein, refers to the newer copolymers of a major amount of ethylene with a minor amount of one or more comonomers selected from $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. The very low density linear low density polyethylenes (VLDPE) have a density from about 0.910 g/cc to about 0.860 g/cc, or even lower.

Optionally, the films of the invention have a barrier layer such as a layer of EVOH or saran or nylon. Also, the films may be heat-shrinkable, i.e. oriented, if desired. In the oriented, heat-shrinkable, preferred embodiment, the low $I_{10}/I_2$ typically does not cause a loss in other properties, i.e. orientation speed and percentage shrink remain essentially the same and sometimes even improve.

Typically, in the manufacture of films, a suitable polymer usually in the form of pellets or the like, is brought into a heated area where the polymer feed is melted and heated to its extrusion temperature and extruded as a tubular "blown bubble" through an annular die.

Other methods, such as "slot die" extrusion wherein the resultant extrudate is in planar, as opposed to tubular, form are also well known. If heat shrinkable film is desired, then after extrusion, the film is typically cooled and stretched, i.e. oriented by "tenter framing" or by inflating with a "trapped bubble", to impart the heat-shrinkable property to the film, as is further described below. If desired, irradiation, typically via an electron beam, may take place after but preferably takes place prior to the stretching for orienting the film. However, for the present invention, such irradiation is not necessary since a very suitable packaging film is obtained without irradiation.

In the preferred embodiment as illustrated in the Example below, the film is an oriented, barrier film with some of its layers irradiated; therefore, below is first described in detail the general process for making and orienting film. Then irradiation is described in detail.

More particularly, the manufacture of shrink, i.e. oriented, films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orienting the film may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched to orient or align the crystallites and/or molecules of the material, and then cooled again. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively stretched to provide a heat-shrinkable film.

The terms "orienting" or "oriented" are used herein to describe generally the process steps and resultant product characteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and release stress. Both of these properties may be measured in accordance with ASTM D 2838-81. When the stretching force is applied in one direction, monoaxial orientating results. When the stretching force is applied in two directions, biaxial orientating results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature. However, by "orientation processing characteristics or properties" as that term is used herein, it is specifically intended to mean the orientation speed during processing in making the oriented film. When it is intended to refer to the percent shrink of the film and bags made therefrom, then the term "heat-shrinkability characteristics or properties" or the term "shrink characteristics or properties" is employed herein.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orienting procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable (i.e. oriented) type, then after wrapping, the enclosed product may be subjected to elevated temperatures, for example, by passing the enclosed product through a hot air tunnel or by placing the enclosed product in hot water. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

The above general outline for manufacturing of films is not meant to be all inclusive since such processes are well known to those in the art. For example, see U.S. Pat. Nos. 4,274,900; 4,299,241; 4,194,039; 4,188,443; 4,048,428; 3,821,182; 3,555,604 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiments as illustrated in the example below, the multi-layer film of the invention contains a barrier layer. The layer is a barrier to fluids such as gas. The barrier layer may be composed of a layer comprising vinylidene chloride copolymer (commonly known as saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. The term "saran" or "PVDC", as used herein, refers to a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates having 1 to 18 carbon atoms in the alkyl group. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being generally compatible with that of the other components of the multi-layer film, preferably in the range of about 3-10 (melt flow being determined generally in accordance with ASTM D1238). The gas of main concern is oxygen and transmission is considered to be sufficiently low, i.e. the barrier material is relatively gas impermeable, when the transmission rate is below 70 cc/m$^2$/mil thickness/24 hours/atms, as measured according to the procedures of ASTM Method D-1434. The barrier layer of the multi-layer barrier shrink film according to the preferred film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer. It is also well known that many polyamides, i.e. commonly known a nylons, have an oxygen transmission rate below the 70 cc and thus also will serve well as the barrier material.

When, as further discussed below, a vinylidene chloride copolymer (PVDC) is employed instead of or together with EVOH as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and acrylonitrile or such as of vinylidene chloride and vinyl chloride or such as of vinylidene chloride and methyl acrylate. (XU32027.01, supplied by Dow Chemical, is a copolymer of vinylidene chloride with methyl acrylate.) In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion and orientation followed by high energy electron irradiation of the multi-layer structure is carried out on a film having a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube and then orient the resultant. This sequence allows for the irradiative treatment of the first and later layer or layers without subjecting the saran barrier layer to the harmful discoloration effects thereof.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

In the Example below the multi-layer films were made by a conventional method of manufacturing, combining tubular coextrusion (colloquially called the hot blown bubble technique) with extrusion coating to achieve an oriented (heat-shrinkable) film. A tubular process was utilized wherein a coextruded tube of a multi-layer substrate core was extrusion coated with saran and another layer simultaneously, then the resultant structure was cooled and collapsed, and then reheated and biaxially stretched in the transverse direction and in the longitudinal machine direction via inflating the tube with a bubble. Then the stretched bubble was cooled and collapsed, and the deflated oriented film wound up as flattened, seamless, tubular film to be used later to make bags, overwrap, et cetera. Prior to the coating of the saran layer and the additional layer, the substrate core was guided through an ionizing radiation field; for example, through the beam of an electron accelerator to receive a radiation dosage in the range of about 4 to 5 megarads (MR).

The LLDPE of low $I_{10}/I_2$ or VLDPE of low $I_{10}/I_2$ may be blended with one or more various other compatible polymers, said one or more other polymers preferably being present in a weight amount up to about 50%, more preferably less than about 35%, most preferably less than about 25%. These various other polymers also may be employed for the inner heat sealing layer of the preferred multi-layer barrier films of the present invention. Many of these other polymers are also suitable for use in any other layers of the films of the present invention, whether or not the films are barrier films and whether or not the films are oriented. Suitable other polymers include, but are not limited to, ethylene vinyl acetate (EVA) copolymers, LDPE, HDPE, MDPE, polypropylene, ethylene/ propylene copolymers, ethylene/alkyl-acrylate copolymers (EAA) [such as ethylene/methyl-acrylate (EMA), ethylene/ethyl-acrylate (EEA), and ethylene/butyl-acrylate (EBA)], acid modified EVA, copolymers of (i) and (ii) where (i) is an alpha-olefin of the formula RHC=CH$_2$ wherein R is H or C$_1$ to C$_8$ alkyl and (ii) is an alpha, beta-ethylenically unsaturated carboxylic acid, and the like and mixtures thereof. Preferably, in the RHC=CH$_2$ copolymer of an olefin and a carboxylic acid, the olefin is ethylene and the carboxylic acid is acrylic acid or methyl-acrylic acid. Materials, which are the copolymer of an alpha-olefin having the formula RHC=CH$_2$ wherein R is H or C$_1$ to C$_8$ alkyl and an alpha, beta-ethylenically unsaturated carboxylic acid, representatively may be one of the Primacor (TM) polymers, supplied by Dow Chemical Company, Midland, Mich. Primacor is produced by the free radical copolymerization of ethylene and a carboxylic acid comonomer therefor such as acrylic acid or methacrylic acid. Also, the copolymer of an alphaolefin having the formula RHC=CH$_2$ wherein R is H or C$_1$ to C$_8$ alkyl and an alpha, beta-ethylenically unsaturated carboxylic acid may be metal salt neutralized such as with sodium, Na. Thus, the copolymer may be an ionomer. Representatively, such an ionomeric material is commercially available as Surlyn (TM) from the E. I. du Pont de Nemours Company of Wilmington, Del., and is described in detail in U.S. Pat. No. 3,355,319 and U.S. Pat. No. 3,845,163.

DEFINITIONS

By "low $I_{10}/I_2$ ratio" is meant the following. For two linear ethylene/alpha-olefin copolymers, if other factors, such as melt index at condition 190/2.16 is essentially the same and density is essentially the same and the comonomer is the same for the two linear ethylene/alpha-olefin copolymers, then the film of the invention made with the copolymer having the lower $I_{10}/I_2$ will exhibit better abuse-resistance than the corresponding film made with the copolymer having the higher $I_{10}/I_2$ ratio. By "essentially the same melt index" is meant that the two melt indices, when measured at condition 190/2.16 of ASTM D1238, are preferably within 0.3 dg/minute, more preferably within 0.2 dg/minute, of each other. Most preferably the two are the same dg/minute. By "essentialy the same density" is meant the two densities are preferably within about $\pm 0.05$ g/cc, more preferably within about $\pm 0.03$ g/cc, of each other.

As used herein the term "extrusion" or the term "extruding" is intended to include coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene", as used herein, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. For film forming purposes, it is desirable that the VA content of the EVA be from about 3% to about 25%.

The term "ethylene/alkyl-acrylate copolymer" (EAA) as used herein refers to a copolymer formed from ethylene and alkyl-acrylate wherein the alkyl moiety has 1 to 8 carbon atoms and the ethylene derived units in the copolymer are present in major amounts and the alkylacrylate derived units in the copolymer are present in minor amounts. Thus, the term "ethylene/methyl acrylate copolymer" (EMA) as used herein refers to a copolymer formed from ethylene and methyl acrylate monomers. The term "ethylene/ethyl acrylate copolymer" (EEA) as used herein refers to a copolymer formed from ethylene and ethyl acrylate monomers. The term "ethylene/butyl acrylate copolymer" (EBA) as used herein refers to a copolymer formed from ethylene and butyl acrylate monomers. Many suitable EBA's are commercially available and these have a butyl acrylate content from about 3% up to about 18% by weight. USI is a commercial supplier of Resin No. 4895, which is an EBA having about 3% by weight butyl acrylate and a melt index of 3 and a melting point of about 106° to 107° C.

The following Example is intended to illustrate the preferred embodiments of the invention and comparisons thereto. It is not intended to limit the invention thereby.

MATERIALS EMPLOYED IN THE EXAMPLE

A suitable adhesive type of polymer employed in the preferred films of the invention is commercially available as Bynel CXA 3101. It is an ethylene-based adhesive with a combination of ester and acid comonomer functionally, (i.e. an acid-modified EVA) and is supplied by du Pont.

Some of the LLDPE employed in the examples was Dowlex 2045.03 having a melt index of 1.1 at condition 190/2.16 and a density of 0.920. It was supplied by Dow Chemical. The comonomer is octene-1.

Some of the LLDPE employed in the Examples was XPR0545-36568-11A having a melt index of 1.0 at condition 190/2.16 and a density of 0.920. The comonomer is octene-1. It was supplied by Dow Chemical.

Some of the VLDPE employed in the Examples was XPR0545-37904-4H, having a melt index of 0.8 at condition 190/2.16 and a density of 0.905. The comonomer is octene-1. It was supplied by Dow Chemical.

Dow XU 61512.08L is a VLDPE supplied by Dow Chemical. It has octene-1 as the comonomer. The density=0.905; MI=0.80 at condition 190/2.16.

Some of the LLDPE employed was DEFD 1630 supplied by Union Carbide. The comonomer is hexene-1; MI=0.5 at condition 190/2.16; and density=0.913.

Some of the VLDPE employed was DEFD 1629 supplied by Union Carbide. The comonomer of DEFD 1629 is hexene-1; MI=0.5 at condition 190/2.16; and density=0.910.

The saran employed in some of the laboratory examples was Ixan (TM) WV320 supplied by Solvay Corporation. It is a copolymer of vinylidene chloride with vinyl chloride.

The EVA employed in the laboratory examples was LD318.92, which is an EVA containing 9% vinyl acetate and having a melt index of 2.0 at condition 190/2.16. It was supplied by Exxon.

EXAMPLE

Percentages indicated in the Example were calculated as % by weight.

The films were made by first hot blowing through an annular die a two-layer extruded tube of the structure: LAYER 1/LAYER 2 as the substrate. Then with a two-ply die, a layer of saran (barrier layer 3) and another layer (outside layer 4) were extrusion coated on. The resultant 4-layer structure was then cooled and collapsed. The tube was then reheated and oriented by stretching via a trapped bubble 4:1 in the transverse direction and 3:1 in the longitudinal direction for an overall biaxial orientation of 12:1. When such films were made into bags, the heat sealing layer 1 was the "inner" or "inside" layer as it was the bag "inside", and "outside" layer 4 was the bag "outside". The test layer 2 and the barrier layer 3 were "interior" layers of the multi-layer film.

The two-layer substrate was irradiated at 4.5 MR prior to the coating on of saran and the outer layer.

equipment were allowed to equilibrate at room temperature for 36–40 hours prior to testing. Three specimens of each kind of film were sequentially placed in the clamp of the apparatus with the inside (layer 1 of the below films) of the sample up. A failure height was selected and the dart released. The height was lowered by 1 inch (2.54 cm) and testing of another three specimens repeated. The 1 inch lowering was successively repeated until all three samples did not break from the impact of the dart.

Films having 4 layers were made and as indicated in Table I below, the polymers for Layer 2 were varied for the various films that were made, whereas the polymers for Layers 1, 3, and 4 were kept the same.

TABLE I

| | SUBSTRATE LAYERS | | EXTRUSION COATED LAYERS | |
|---|---|---|---|---|
| | SEALING LAYER 1 | * LAYER 2 | BARRIER LAYER 3 | OUTSIDE LAYER 4 |
| Polymer: | EVA | LLDPE or VLDPE | SARAN | EVA |
| Before Orientation Thickness: (mils)** | 3 | 14.5 | 3.5 | 6.5 |

*Layer 2 was a blend of 7% Bynel CXA3101 and 93% LLDPE by weight or was a blend of 7% Bynel CXA3101 and 93% VLDPE by weight.
**After orientation, the total thickness of the 4-layer film was about 2.2 mils to about 2.5 mils.

TABLE II

| | Properties of Ethylene/Alpha-Olefin of Layer 2 | | | | ORIEN-TATION SPEED FT/MIN (M/MIN) | Properties of the Film | | | |
|---|---|---|---|---|---|---|---|---|---|
| | | | | | | ABUSE RESISTANCE | | % SHRINK AT 185° F. (85° C.) | |
| | | | | | | CARSON DART DROP INCHES (CM) | BALL BURST (CM-KG) (Room Temp) | | |
| SAMPLE NUMBER | Polymer of LAYER 2 | DEN-SITY g/cc | $I_{10}/I_2$ | MI 190/ 2.16 | COMON-OMER | | | TRANS-VERSE | LONGI-TUDINAL |
| COM-PARATIVE 1 | LLDPE [DOWLEX 2045.03] | 0.920 | 8.07 | 1.0 | OCTENE | 43 (13.1) | 16.0 (40.6) | 45 | 31 | 14 |
| TEST 1 | LLDPE [XPRO545-36568-11A] | 0.920 | 7.18 | 1.0 | OCTENE | 44 (13.4) | 19.0 (48.3) | 46 | 30 | 14 |
| COM-PARATIVE 2 TEST | LLDPE [DEFD1630] | 0.913 | 17.97 | 0.5 | HEXENE | 52 (15.8) | 6.0 | 14 | 34 | 21 |
| TEST 2 | VLDPE [DEFDE1629] | 0.910 | 9.90 | 0.5 | HEXENE | 65 (19.8) | 11.0 (27.9) | 31 | 36 | 23 |
| COM-PARATIVE 3 | VLDPE [XU61512.08L] | 0.905 | 9.05 | 0.8 | OCTENE | 64 (19.5) | 13.0 (33.0) | 37 | 39 | 26 |
| TEST 3 | VLDPE [XPR0545-37904-4H] | 0.905 | 7.29 | 0.8 | OCTENE | 63 (19.2) | 16.0 (40.6) | 46 | 38 | 23 |

Various properties, i.e. orientation speed, abuse resistance (Carson Dart Drop, or ball burst), $I_{10}/I_2$ melt flow ratio and % shrink, were measured for the films as noted in the Table below. The ball burst and shrink were measured in accordance with procedures set out in ASTM D 3420 and ASTM D 2732, respectively. $I_{10}/I_2$ was measured in accordance with ASTM D 1238, and the ratio is that of condition 190/10 in dg/minute to condition 190/2.16 in dg/minute.

The Carson Dart Drop is an impact test that measures the impact resistance of film by the free-falling dart method. The apparatus employed for the free-falling dart impact was as described in ASTM D 1709. The dart weighed about 41.5 grams. Film samples of about 7×7 inches (17.8×17.8 cm) were cut. Samples and As can be seen, for instance, from Comparative Sample 1 and Test Sample 1, the test film where the LLDPE of layer 2 had the lower $I_{10}/I_2$ ratio (7.18) exhibited better abuse resistance (dart drop=48.3 cm and ball burst=46 cm-kg) than the comparative film wherein the LLDPE of layer 2 had the higher $I_{10}/I_2$ ratio (8.07) which had a worse abuse resistance (dart drop=40.6 cm and ball burst=45 cm-kg).

Likewise, as can be seen, from Comparative Sample 2 and Test Sample 2, the test film where LLDPE of layer 2 had the lower $I_{10}/I_2$ ratio (9.90) exhibited better abuse resistance (dart drop=27.9 cm and ball burst=31 cm-kg) than the comparative film wherein the LLDPE of layer 2 had the higher $I_{10}/I_2$ ratio (17.9) which had a worse abuse resistance (dart drop=15.2 cm and ball burst=14 cm-kg).

Likewise also, for Comparative Sample 3 and Test Sample 3, the film where the LLDPE of layer 2 had the lower $I_{10}/I_2$ ratio (7.29) exhibited better abuse resistance (dart drop=40.6 cm and ball burst=46 cm-kg) than the film wherein the LLDPE of layer 2 had the higher $I_{10}/I_2$ ratio (9.05) which had a worse abuse resistance (dart drop=33.0 cm and ball burst=37 cm-kg).

While certain representative embodiments and details have been shown for the purpose of illustration, numerous modifications to the formulations described above can be made without departing from the invention disclosed.

What is claimed is:

1. A heat-shrinkable packaging film of improved abuse resistance comprising at least one layer of a linear copolymer of ethylene and an alpha-olefin with a density of about 0.935 g/cc or less selected from ethylene/alpha-olefin copolymer having (a) a low $I_{10}/I_2$ melt flow ratio of about 7.2 when said alpha-olefin is octene or (b) a low $I_{10}/I_2$ melt flow ratio of about 9.9 and a comonomer of hexene.

2. The film of claim 1, wherein said copolymer of ethylene and an alpha-olefin of low $I_{10}/I_2$ ratio is in blend with another polymer compatible therewith.

3. The film of claim 2, wherein said layer of ethylene/alpha-olefin copolymer having a low $I_{10}/I_2$ ratio further includes up to 50% by weight, based on the layer composition, of a polymer which is compatible with said ethylene/alpha-olefin copolymer and is selected from ethylene/alkyl-acrylate copolymer, high density polyethylene (HDPE), linear medium density polyethylene (LMDPE), linear high density polyethylene (LHDPE), low density polyethylene (LDPE), medium density polyethyle (MDPE), ethylene/vinyl acetate (EVA), acid-modified EVA, polypropylene, ethylene/propylene copolymers, copolymers of an alpha-olefin having the formula $RHC=CH_2$ wherein R is H or $C_1$ to $C_8$ alkyl and an alpha, beta-ethylenically unsaturated carboxylic acid, and mixtures thereof.

4. The film of claim 1, wherein said film is a multi-layer film including a barrier layer.

5. The film of claim 1, wherein said film is a multi-layer film and at least one layer of copolymer of ethylene/alpha-olefin of low $I_{10}/I_2$ ratio is an interior layer of the multi-layer film.

6. The film of claim 1, wherein said at least one layer of ethylene/alpha-olefin copolymer of low $I_{10}/I_2$ ratio has been irradiated at a dosage up to about 20 MR.

7. A bag formed from the film of claim 1, said bag having end seal(s), side seal(s), or a combination thereof.

8. The bag of claim 7, wherein the film of the bag is a multi-layer film including a barrier layer.

9. The bag of claim 8, wherein at least one layer of copolymer of ethylene/alpha-olefin of low $I_{10}/I_2$ ratio is an interior layer of the multi-layer film.

10. The bag of claim 7, wherein the film of the bag is a heat-shrinkable film.

11. A thermoplastic, heat-shrinkable packaging film of improved abuse resistance comprising (I) a layer of a linear copolymer of ethylene and an alpha-olefin with a density of about 0.935 g/cc or less selected from ethylene/alpha-olefin copolymer having (a) a low $I_{10}/I_2$ ratio of about 7.2 when said alpha-olefin is octene or (b) a low $I_{10}/I_2$ ratio of about 9.9 and a comonomer of hexene, and (II) a layer of barrier material.

12. A heat-shrinkable packaging film of improved abuse resistance comprising a layer of a linear copolymer of ethylene and an alpha-olefin with a density of about 0.935 g/cc or less selected from ethylene/alpha-olefin copolymer having (a) a low $I_{10}/I_2$ melt flow ratio of about 7.2 and a comonomer of octene or (b) a low $I_{10}/I_2$ melt flow ratio of about 9.9 when said alpha-olefin is hexene, said ethylene/alpha-olefin copolymer having a comparatively lower $I_{10}/I_2$ ratio than the corresponding ethylene/alpha-olefin copolymer with the same comonomer and essentially the same density but a comparatively higher $I_{10}/I_2$ ratio, said packaging film exhibiting better abuse resistance than the corresponding film made of the ethylene/alpha-olefin copolymer having the higher $I_{10}/I_2$ ratio, wherein said lower $I_{10}/I_2$ ratio and said higher $I_{10}/I_2$ ratio differ by an amount above about 0.5.

13. A thermoplastic, mult-layer, heat-shrinkable packaging film having excellent abuse resistance, comprising in direct surface-to-surface contact at least the 4-layer structure: an outside polymer layer, a barrier layer, and interior layer, a heat sealing layer, wherein said interior layer comprises a linear copolymer of ethylene and an alpha-olefin with a density of about 0.935 g/cc or less selected from ethylene/alpha-olefin copolymer having (a) a low $I_{10}/I_2$ melt flow ratio of about 7.2 when said alpha-olefin is octene or (b) a low $I_{10}/I_2$ melt flow ratio of about 9.9 and a comonomer of hexene.

14. The film of claim 13, wherein said interior layer further includes up to 50% by weight, based on the layer composition, of a polymer which is compatible with said ethylene/alpha-olefin copolymer and is selected from ethylene/alkyl-acrylate copolymer, high density polyethylene (HDPE), linear medium density polyethylene (LMDPE), linear high density polyethylene (LHDPE), low density polyethylene (LDPE), medium density polyethylene (MDPE), ethylene/vinyl acetate (EVA), acid-modified EVA, polypropylene, ethylene/propylene copolymers, copolymers of an alpha-olefin having the formula $RHC=CH_2$ wherein R is H or $C_1$ to $C_8$ alkyl and an alpha, beta-ethylenically unsaturated carboxylic acid, and mixtures thereof.

15. The film of claim 13, wherein said interior layer of ethylene/alpha-olefin having a low $I_{10}/I_2$ ratio has been irradiated at a dosage up to about 20 MR.

* * * * *

UNITED STATES PATENT AND TRADEMARK OFFICE
CERTIFICATE OF CORRECTION

PATENT NO. : 4,820,557

DATED : April 11, 1989

INVENTOR(S) : Thomas C. Warren

It is certified that error appears in the above-identified patent and that said Letters Patent is hereby corrected as shown below:

Column 13, line 26;
Column 14, line 19;
Column 14, line 41;

Delete all occurences of "and a comonomer of" and substitute in its place --wherein said alpha-olefin is--.

Signed and Sealed this

Twelfth Day of November, 1991

*Attest:*

HARRY F. MANBECK, JR.

*Attesting Officer*      *Commissioner of Patents and Trademarks*